United States Patent [19]

Dove

[11] Patent Number: 4,570,974

[45] Date of Patent: Feb. 18, 1986

[54] SAFETY VEST

[76] Inventor: Arthur Dove, 40 Samoset St., Weymouth, Mass. 02190

[21] Appl. No.: 605,195

[22] Filed: Apr. 30, 1984

[51] Int. Cl.4 .............................................. B62B 35/00
[52] U.S. Cl. .................................... 280/801; 297/464; 297/484
[58] Field of Search ................ 280/801, 802; 297/484, 297/488, 195, 338, 464, 468; 244/151 R, 151 A

[56] References Cited

U.S. PATENT DOCUMENTS

| | | | |
|---|---|---|---|
| 3,827,716 | 8/1974 | Vaughn et al. | 280/801 |
| 4,129,321 | 12/1978 | Garvey | 297/468 |
| 4,145,074 | 3/1979 | Hendricks | 280/808 |
| 4,251,100 | 2/1981 | Rolandelli | 280/801 |
| 4,488,691 | 12/1984 | Lorch | 280/801 |

FOREIGN PATENT DOCUMENTS 2227744  11/1974  France ................................ 280/801

*Primary Examiner*—Richard A. Bertsch

[57] ABSTRACT

This invention is directed at a safety vest for use by personel in the compartment of a moving vehicle such as an ambulance. The vest is attached by a strap to a reel and a track in the roof of the vehicle. The user can work freely in a standing position; however, on sudden movement or stop the vest and the reel and strap will prevent the user from being thrown.

12 Claims, 4 Drawing Figures

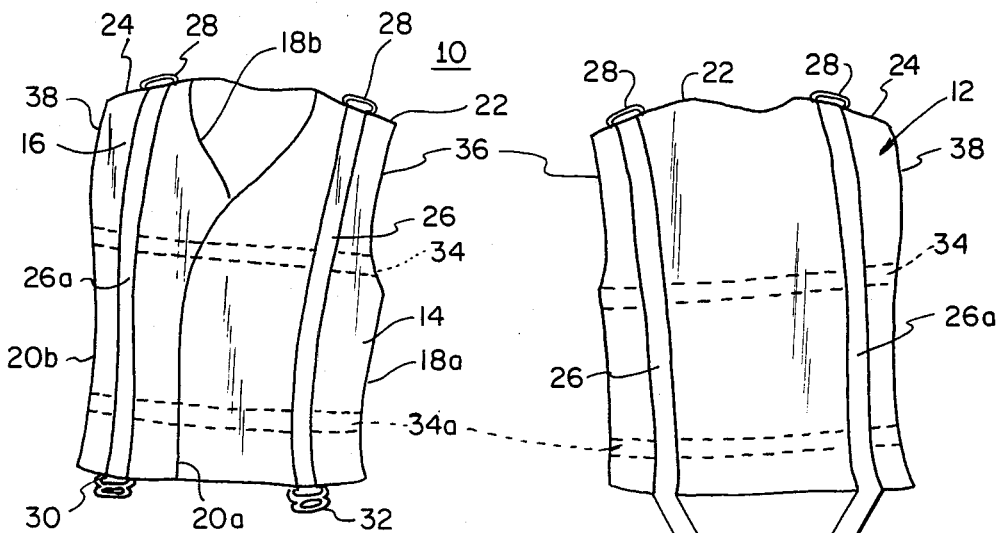
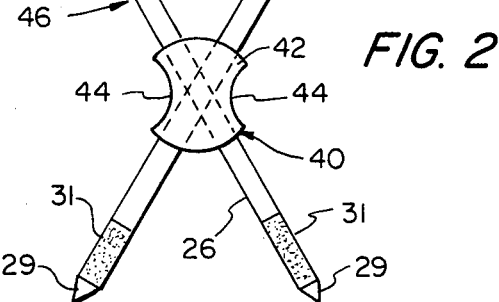
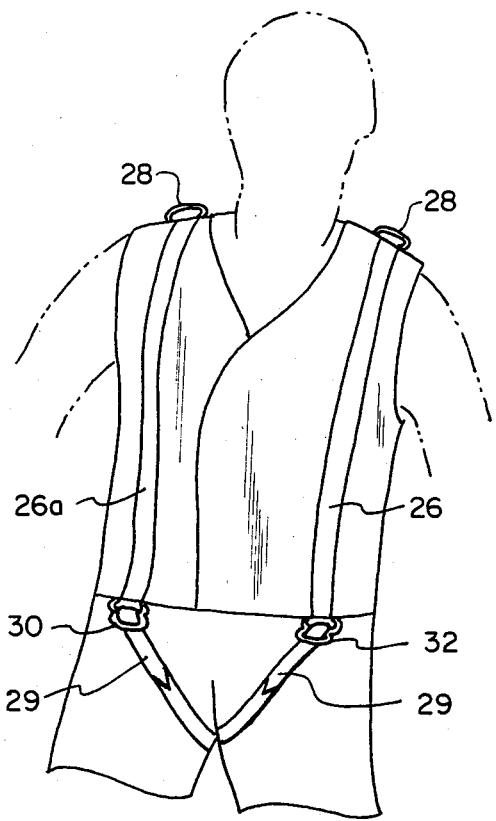
FIG. 1
FIG. 2
FIG. 3

SAFETY VEST

BACKGROUND OF THE INVENTION

One of the great dangers faced by attendants caring for a patient in a moving vehicle, such as an ambulance, is a sudden stop or start made by the vehicle. This type of action may occur due to the necessity of braking or may occur due to a collision between the vehicle and another object.

If a sudden stop does occur and the attendant is on his feet caring for the patient, the attendant will be thrown about in the compartment with a good chance of receiving serious injury.

To the inventor's present knowledge, there is no safety device available which will allow the attendant to move about and perform his duties and will prevent the attendent from being knocked from his feet on sudden impact.

SUMMARY OF THE INVENTION

This invention is directed at a safety vest which permits safe standing in a moving vehicle, the vest comprising first attachment means associated with the right shoulder portion of the vest, a second attachment means associated with the left shoulder portion of the safety vest and a crotch pad associated with the back and front panel of the safety vest whereby at least one line extends from a reel structure which moves within a track attached to the roof of the vehicle to the first attachment means. The reel structure is preferably an automatic inertia-operated reel.

The first and second attachment means of the safety vest are D rings.

The safety vest includes horizontal and vertical reinforcing means.

BRIEF DESCRIPTION OF THE DRAWINGS

Further details are explained below with the help of the examples illustrated in the attached drawings in which:

FIG. 1 is a front elevational view of the safety vest, with the straps and the crotch panel left off, according to the present invention;

FIG. 2 is a rear elevational view of the safety vest, according to the present invention;

FIG. 3 is a front elevational view of the safety vest, according to the present invention, worn by a user.

DESCRIPTION OF THE PREFERRED EMBODIMENT(S)

Figure 4:
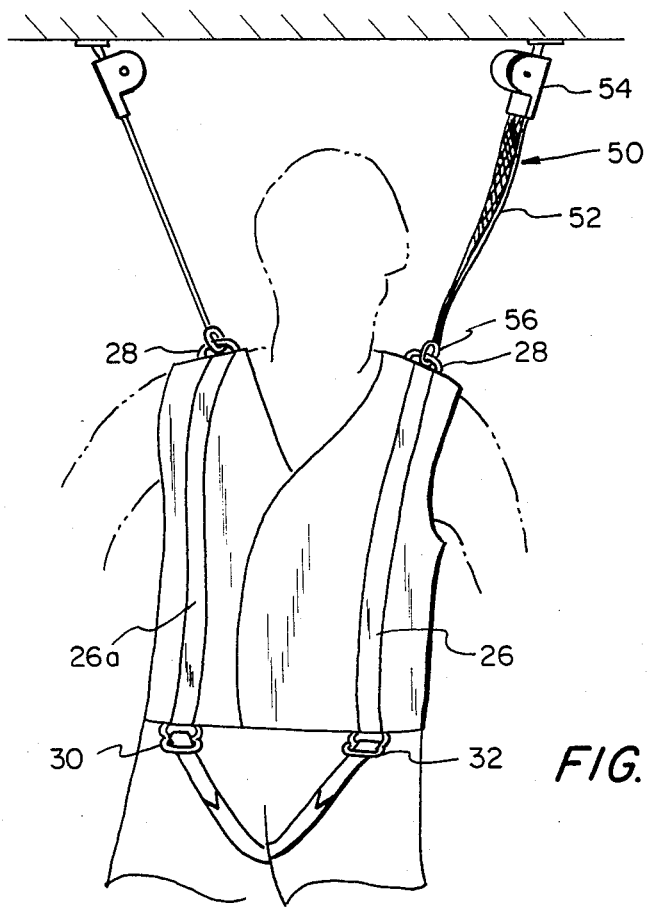
FIG. 4 is a front elevational view of the safety vest, according to the present invention worn by a user and attached to reels and to the roof of an ambulace compartment.

There is shown in the drawings a safety garment 10, a vest for example, comprising a front panel and a back panel 12. The front panel is divided into a first or right portion 14 and a second or left portion 16. The first portion 14 and the second portion 16 each have a right side 18a, 18b and a left side 20a, 20b respectively. The right side 18a of the right portion 14 is attached to a side of the back panel 12 and the left side 20b of the left portion 16 is attached to the other side of the back panel 12. The left side 20a of the right portion 14 overlaps the right side 18b of the left portion 16. The left side 20a and the right side 18b can be engaged together through the use of VELCRO strips attached to those sides. A part of the upper portion of the right portion 14 is attached to the upper portion of the left side of the back panel 12 to provide a right shoulder section or portion 22 and a part of the upper portion of the second portion 16 is attached to the upper portion of the right side of the back panel 12 to provide a left shoulder section or portion 24. A vertical reinforcement tape 26 extends continuously from the lower side of the first portion 14 up over the right shoulder section 22 down the full length of the back panel 12 and a second vertical reinforcement tape 26a extends continuously from the lower side of the second portion 16 up over the left shoulder section 24 down the full length of the back panel 12. The vertical reinforcement tapes 26, 26a are in parallel, spaced relation to each other when they are attached to the garment 10 and each of them passes through one steel, first D ring 28 attached to and extending from each of the shoulder sections 22, 24. They are each extended beyond the garment 10 and cross each other as shown in FIG. 2. The tapes 26, 26a each include a free terminal end 29 and include an engagement portion 31 formed of VELCRO or the like. One pair of second, steel D rings 30 is attached to the lower side of the second portion 16 and third pair 32 is attached to the lower side of the first portion 14. The first vertical reinforcement tape 26 passes through the pair of third D rings 32 and the second vertical reinforcement tape 26a passes through the pair of second D rings 30. The first vertical reinforcement tape 26 passes from the bottom right edge of the first portion 14, through the third D rings 32 vertically up the first portion 14 through a first D ring 28 and vertically down the back panel 12 to its extension beyond the garment 10 and thence to its cross over with the tape 26a terminating at its free end 29. The second vertical reinforcement tape 26a passes from the bottom left edge of the second portion 16, through a second pair of D rings 30 vertically up the second portion 16 through a first D ring 28 and vertically down the back panel 12 to its extension beyond the garment 10 and thence to its cross over with the tape 26 terminating at its free end 29. Each of the first, second pair and third pair of D rings 28, 30, 32 are sewn in position. A first augmentation tape 34 is sewn on the inner surface of the garment 10 extending from the left side 20a of the first portion 14 on a horizontal plane under the first arm hole 36 thence on the same horizontal plane along the back panel 12 under the second arm hole 38 along the second portion 16 terminating at the right side 18b of the second portion 16. A second augmentation tape 34a is sewn on the inner surface of the garment 10 extending from the left side 20a of the first portion 14 on a horizontal plane spaced from the bottom edge of the first portion 14 thence on the same horizontal plane along the back panel 12 spaced from the bottom edge thereof then on the same horizontal plane along the second portion 16 terminating at the right side 18b of the second portion 16. The first and second augmentation tapes 34, 34a are formed from a heavy material, canvas for example.

A crotch piece 40 comprises a crotch pad or panel 42 is generally circular in configuration, has an arcuate indentation 44 formed on opposite sides of the crotch panel 42 and is adapted to bear against the inner thigh of the wearer. The crotch piece 40 is sewn to the extensions of the tapes 26, 26a where they cross over each other and in the position shown in FIG. 2.

To use the garment 10, the user puts it on as he would a vest with the assembly 46 of the extended straps 26, 26a and the attached crotch piece 40 hanging below his buttocks. The user then bends down and brings the assembly 46 under the crotch and in front of his body. The terminal end 29 of the extension of the tape 26 is passed through the second pair of D rings 30 and the terminal end 29 of the extension of the tape 26a is passed through the third pair of D rings 32 are cinched up and then held in position by attaching each of the engagement portions 31 to itself as indicated in FIG. 3. This action positions the crotch panel 42 against the crotch of the wearer. The user being in the compartment of an ambulance, for example, attaches the garment 10 to the roof of the compartment through a restraining apparatus 50. The restraining apparatus 50 is fixedly engaged to the roof of the cabin and comprises a restraining element, in this case a support strap 52, and a reel structure 54. The support strap 52 is operatively associated with the reel structure 54 and includes a snap element 56 at its terminal end remote from its association with the reel structure 54. The restraining apparatus 50 permits the support strap 52 when it is to be used to be protracted so that it may be snap engaged by the snap element 56 to a first D ring 28. The restraining apparatus 50 also permits the support strap 52 after it has been snap engaged by the snap element 56 to a first D ring 28 to be further protracted so that the wearer of the garment 10 may within a limited area move within the compartment but will on sudden impact render the support strap 52 incapable of being protracted to any extent and to thereby act as a shock restraint. In order to accomplish this result, the reel structure 54 is a so called automatic inertia-operated reel similar to that shown in the U.S. Pat. No. 2,706,603 to Joseph A. Miller issued Apr. 19, 1955 and the reel disclosed in the said Miller patent is incorporated by reference herein.

What I claim is:

1. A safety vest which permits safe standing in a moving vehicle, the vest comprising a front panel, a back panel, a right shoulder portion, a left shoulder portion and a crotch pad, the front panel having a right bottom portion and a left bottom portion, the back panel having a first side and a second side, the second side spaced from the first side, the right shoulder portion and the left shoulder portion spaced from each other and both associated with the back panel and with the front panel, the first and second sides of the back panel associated with the front panel, first attachment means associated with the right shoulder portion, second attachment means associated with the left shoulder portion and the crotch pad associated with the back panel and having means for association with the front panel whereby at least one line extending from a reel engaged with the roof of the vehicle is adapted to engage the first attachment means, the first and second attachment means being D rings and the back panel has a first bottom portion and a second bottom portion, a first strap extension extending from the first bottom portion and a second strap extension extending from the second bottom portion, the front panel having a right bottom portion and a left bottom portion, the right bottom portion having a fifth attachment means associated therewith, the left bottom portion having a sixth attachment means associated therewith, the crotch pad adapted to engage the first and second strap extensions and the first strap extension means adapted to engage the fifth attachment means and the second strap extension adapted to engage the sixth attachment means.

2. A safety vest as set forth in claim 1 including right and left arm holes, a first reinforcing means attached to and circumscribing the front and back panels on a horizontal plane proximate the right and left arm holes and between the right and left arm holes and the first bottom portion and a second bottom portion.

3. A safety vest as set forth in claim 2 further comprising a first vertical reinforcing means extending from the first attachment means to first bottom portion, the plane of the first reinforcing means traversing the plane of the first vertical reinforcing means.

4. A safety vest as set forth in claim 1 further comprising a first vertical reinforcing means extending from the first attachment means to the first bottom portion.

5. A safety vest as set forth in claim 1 further comprising a second vertical reinforcing means extending from the second attachment means to the second bottom portion.

6. The combination of an emergency vehicle and a safety vest, the emergency vehicle having a patient compartment and a roof, the vest for use in the patient compartment to support a standing medical attendent performing emergency medical services on a patient, the vest comprising a front panel, a back panel, a right shoulder portion, a left shoulder portion and a crotch pad, the front panel having a right bottom portion and a left bottom portion, the back panel having a first side and a second side, the second side spaced from the first side, the right shoulder portion and the left shoulder portion spaced from each other and both associated with the back panel and with the front panel, the first and second sides of the back panel associated with the front panel, first attachment means associated with the right shoulder portion, second attachment means associated with the left shoulder portion and the crotch pad associated with the back panel and having means for association with the front panel, at least one line extending from a reel, the reel engaged in right angle relationship with the roof of the emergency vehicle and the line having means engaging the first attachment means.

7. A safety vest as set forth in claim 6 wherein the first and second attachment means are D rings.

8. A safety vest as set forth in claim 6 wherein the back panel has a first bottom portion and a second bottom portion, a first strap extension extending from the first bottom portion and a second strap extension extending from the second bottom portion, the front panel having a right bottom portion and a left bottom portion, the right bottom portion having a fifth attachment means associated therewith, the left bottom portion having a sixth attachment means associated therewith, the crotch pad engaged to the first and second strap extensions and the first strap extension means adapted to be engaged to the fifth attachment means and the second strap extension adapted to be engaged to the sixth attachment means.

9. A safety vest as set forth in claim 8 including right and left arm holes, a first reinforcing means attached to and circumscribing the front and back panels on a horizontal plane proximate the right and left arm holes and between the right and left arm holes and the first bottom portion and a second bottom portion.

10. A safety vest as set forth in claim 9 further comprising a first vertical reinforcing means extending from the first attachment means to first bottom portion, the plane of the first reinforcing means traversing the plane of the first vertical reinforcing means.

11. A safety vest as set forth in claim 8 further comprising a first vertical reinforcing means extending from the first attachment means to the first bottom portion.

12. A safety vest as set forth in claim 8 further comprising a second vertical reinforcing means extending from the second attachment means to the second bottom portion.

* * * * *